(12) United States Patent
Khalatian et al.

(10) Patent No.: US 10,671,337 B2
(45) Date of Patent: Jun. 2, 2020

(54) AUTOMATIC SIZING OF AGENT'S SCREEN FOR HTML CO-BROWSING APPLICATIONS

(71) Applicant: ORACLE INTERNATIONAL CORPORATION, Redwood Shores, CA (US)

(72) Inventors: Igor Khalatian, Morganville, NJ (US); Albert Manukyan, Yerevan (AM)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 561 days.

(21) Appl. No.: 14/865,711

(22) Filed: Sep. 25, 2015

(65) Prior Publication Data

US 2017/0090853 A1 Mar. 30, 2017

(51) Int. Cl.
*G06Q 10/10* (2012.01)
*G06F 3/147* (2006.01)
(Continued)

(52) U.S. Cl.
CPC .............. *G06F 3/147* (2013.01); *G06F 3/14* (2013.01); *G06F 3/1454* (2013.01); *G06F 9/542* (2013.01);
(Continued)

(58) Field of Classification Search
CPC ...... G06F 3/14; G06F 3/147; G06F 17/30873; G06F 3/1454; G06F 9/542; G06F 16/954;
(Continued)

(56) References Cited

U.S. PATENT DOCUMENTS 5,107,443 A 4/1992 Smith et al.
5,515,491 A 5/1996 Bates et al.
(Continued)

FOREIGN PATENT DOCUMENTS

| WO | 2008008806 |  | 1/2008 |
|---|---|---|---|
| WO | 2008008806 | A3 | 10/2008 |
| WO | 2010096808 | A2 | 2/2010 |

OTHER PUBLICATIONS

U.S. Appl. No. 13/762,725, Final Office Action dated Sep. 27, 2016, 32 pages.
(Continued)

*Primary Examiner* — Amy Ng
*Assistant Examiner* — Sajeda Muhebbullah
(74) *Attorney, Agent, or Firm* — Kagulijac Law Group, LLC

(57) ABSTRACT

Embodiments of the invention provide systems and methods for automatic or adaptive sizing of a customer service agent's co-browsing view of a contact's user interface. According to one embodiment, at least a portion of the agent's interface in which the customers interface is presented can be resized so that the agent's view matches the customer's view, e.g., one-to-one. This sizing of the agent's view may be performed automatically, when the co-browsing view of the customer's interface is first presented to the agent or, according to one embodiment, may be toggled on and off by the agent, e.g., by the agent selecting a button or other control presented in the agent's interface. In this way, embodiments allow the agent to see exactly the same view of the web site as the customer sees in the customer's interface regardless of the device or screen size used by the customer.

16 Claims, 5 Drawing Sheets

(51) Int. Cl.
   *G06F 16/954* (2019.01)
   *G06F 3/14* (2006.01)
   *H04L 12/18* (2006.01)
   *G06F 9/54* (2006.01)

(52) U.S. Cl.
   CPC ........... *G06F 16/954* (2019.01); *G06Q 10/10* (2013.01); *G06Q 10/101* (2013.01); *G06Q 10/103* (2013.01); *H04L 12/1813* (2013.01)

(58) Field of Classification Search
   CPC .... G06Q 10/10; G06Q 10/101; G06Q 10/103; H04L 12/1813
   See application file for complete search history.

(56) References Cited

U.S. PATENT DOCUMENTS

| | | | |
|---|---|---|---|
| 5,838,906 | A | 11/1998 | Doyle et al. |
| 5,872,923 | A | 2/1999 | Schwartz et al. |
| 5,884,014 | A | 3/1999 | Huttenlocher et al. |
| 5,960,411 | A | 9/1999 | Hartman et al. |
| 6,308,199 | B1 | 10/2001 | Katsurabayashi |
| 6,331,855 | B1 | 12/2001 | Schauser |
| 6,396,520 | B1 | 5/2002 | Ording |
| 6,442,590 | B1 | 8/2002 | Inala et al. |
| 6,460,081 | B1 | 10/2002 | Doherty et al. |
| 6,717,607 | B1 | 4/2004 | Lauper et al. |
| 6,785,708 | B1 | 8/2004 | Busey et al. |
| 7,149,776 | B1* | 12/2006 | Roy ................... G06F 17/30873 709/205 |
| 7,185,056 | B2 | 2/2007 | Fujisawa et al. |
| 7,263,526 | B1 | 8/2007 | Busey et al. |
| 7,343,567 | B2 | 3/2008 | Mann et al. |
| 7,933,955 | B2 | 4/2011 | Khalatian |
| 8,046,259 | B1 | 10/2011 | Siegel et al. |
| 8,117,560 | B1 | 2/2012 | Lu et al. |
| 8,495,660 | B1 | 7/2013 | Hernacki |
| 8,788,949 | B2 | 7/2014 | Hunt et al. |
| 8,831,203 | B2 | 9/2014 | Chang et al. |
| 8,842,156 | B1 | 9/2014 | Alekhin |
| 9,313,332 | B1 | 4/2016 | Kumar et al. |
| 9,535,651 | B2 | 1/2017 | Khalatian |
| 9,699,446 | B2* | 7/2017 | Zhu ........................ H04N 17/00 |
| 9,874,990 | B2 | 1/2018 | Khalatian |
| 9,967,399 | B2 | 5/2018 | Khalatian et al. |
| 2002/0038346 | A1 | 3/2002 | Morrison et al. |
| 2002/0101445 | A1 | 8/2002 | Berque |
| 2002/0138624 | A1* | 9/2002 | Esenther ................. H04L 29/06 709/227 |
| 2002/0191028 | A1 | 12/2002 | Senechalle et al. |
| 2003/0085923 | A1 | 5/2003 | Chen et al. |
| 2003/0088623 | A1 | 5/2003 | Kusuda |
| 2003/0093464 | A1 | 5/2003 | Clough et al. |
| 2004/0075619 | A1 | 4/2004 | Hansen |
| 2004/0078441 | A1 | 4/2004 | Malik et al. |
| 2004/0080504 | A1 | 4/2004 | Salesky et al. |
| 2004/0210658 | A1 | 10/2004 | Guillermo et al. |
| 2004/0240642 | A1 | 12/2004 | Crandell et al. |
| 2004/0252185 | A1 | 12/2004 | Vernon et al. |
| 2004/0253991 | A1 | 12/2004 | Azuma |
| 2004/0268263 | A1 | 12/2004 | Van Dok et al. |
| 2005/0111392 | A1 | 5/2005 | Thompson et al. |
| 2005/0129275 | A1 | 6/2005 | Porter et al. |
| 2005/0129277 | A1 | 6/2005 | Porter et al. |
| 2005/0141694 | A1 | 6/2005 | Wengrovitz |
| 2005/0223343 | A1 | 10/2005 | Travis et al. |
| 2005/0235014 | A1 | 10/2005 | Schauser et al. |
| 2005/0246634 | A1 | 11/2005 | Ortwein et al. |
| 2005/0268237 | A1 | 12/2005 | Crane et al. |
| 2006/0031779 | A1 | 2/2006 | Theurer et al. |
| 2006/0130109 | A1 | 6/2006 | Zenith |
| 2007/0038956 | A1 | 2/2007 | Morris |
| 2007/0245249 | A1 | 10/2007 | Weisberg |
| 2008/0016155 | A1 | 1/2008 | Khalatian |
| 2008/0052377 | A1 | 2/2008 | Light |
| 2008/0167124 | A1 | 7/2008 | Korchemniy et al. |
| 2008/0209387 | A1 | 8/2008 | Biehl et al. |
| 2008/0276183 | A1 | 11/2008 | Siegrist et al. |
| 2008/0276184 | A1 | 11/2008 | Buffet et al. |
| 2009/0024952 | A1 | 1/2009 | Brush et al. |
| 2009/0055500 | A1 | 2/2009 | Haynes et al. |
| 2009/0100328 | A1 | 4/2009 | Asakawa et al. |
| 2009/0158163 | A1 | 6/2009 | Stephens et al. |
| 2009/0164581 | A1 | 6/2009 | Bove et al. |
| 2009/0219379 | A1 | 9/2009 | Rossato et al. |
| 2009/0247136 | A1 | 10/2009 | Srinivasan et al. |
| 2009/0254840 | A1 | 10/2009 | Churchill et al. |
| 2009/0271713 | A1 | 10/2009 | Stull et al. |
| 2009/0327441 | A1 | 12/2009 | Lee et al. |
| 2010/0017412 | A1 | 1/2010 | Horowitz et al. |
| 2010/0036670 | A1 | 2/2010 | Hill et al. |
| 2010/0037153 | A1 | 2/2010 | Rogers |
| 2010/0111286 | A1 | 5/2010 | Chishti |
| 2010/0111406 | A1 | 5/2010 | Hertzfeld et al. |
| 2010/0115042 | A1 | 5/2010 | Turner |
| 2010/0131868 | A1 | 5/2010 | Chawla et al. |
| 2010/0158236 | A1 | 6/2010 | Chang et al. |
| 2010/0199187 | A1 | 8/2010 | Lin et al. |
| 2010/0257457 | A1 | 10/2010 | De Goes |
| 2010/0296646 | A1 | 11/2010 | Hemm et al. |
| 2010/0306642 | A1 | 12/2010 | Lowet et al. |
| 2011/0087984 | A1 | 4/2011 | Jitkoff et al. |
| 2011/0154219 | A1 | 6/2011 | Khalatian |
| 2011/0173256 | A1 | 7/2011 | Khalatian |
| 2011/0182283 | A1 | 7/2011 | Van Buren et al. |
| 2011/0276900 | A1 | 11/2011 | Khan et al. |
| 2011/0307402 | A1 | 12/2011 | Krishnakumar et al. |
| 2012/0030616 | A1 | 2/2012 | Howes et al. |
| 2012/0069045 | A1 | 3/2012 | Hashimoto et al. |
| 2012/0096344 | A1* | 4/2012 | Ho ........................ G06F 17/211 715/249 |
| 2012/0185784 | A1 | 7/2012 | Katz |
| 2012/0189272 | A1 | 7/2012 | Kunigita et al. |
| 2012/0254770 | A1 | 10/2012 | Ophir |
| 2013/0055113 | A1 | 2/2013 | Chazin et al. |
| 2013/0080928 | A1 | 3/2013 | Zhuang et al. |
| 2013/0212466 | A1 | 8/2013 | Khalatian |
| 2014/0019534 | A1* | 1/2014 | Handrigan ........ G06F 17/30873 709/204 |
| 2014/0119531 | A1 | 5/2014 | Tuchman et al. |
| 2014/0129622 | A1* | 5/2014 | Michaeli ................ G06Q 10/10 709/203 |
| 2014/0161241 | A1 | 6/2014 | Baranovsky et al. |
| 2014/0164934 | A1 | 6/2014 | Yang |
| 2014/0173078 | A1 | 6/2014 | McCord et al. |
| 2014/0219438 | A1 | 8/2014 | Brown et al. |
| 2014/0258501 | A1 | 9/2014 | D'Arcy et al. |
| 2014/0278534 | A1 | 9/2014 | Romeo |
| 2014/0341369 | A1 | 11/2014 | Chang et al. |
| 2015/0052067 | A1 | 2/2015 | Thiyagarajan et al. |
| 2015/0055772 | A1 | 2/2015 | Klemm et al. |
| 2015/0149916 | A1 | 5/2015 | Mendez et al. |
| 2015/0244814 | A1 | 8/2015 | Khalatian et al. |
| 2015/0278534 | A1 | 10/2015 | Thiyagarajan et al. |
| 2015/0310446 | A1 | 10/2015 | Tuchman et al. |
| 2015/0324772 | A1 | 11/2015 | Sarris |
| 2016/0036981 | A1 | 2/2016 | Hollenberg et al. |
| 2016/0085381 | A1* | 3/2016 | Parker ................... G06F 3/1454 715/753 |
| 2016/0182721 | A1 | 6/2016 | Khalatian et al. |
| 2017/0070526 | A1 | 3/2017 | Bailey et al. |

OTHER PUBLICATIONS

U.S. Appl. No. 13/762,725, Notice of Allowance dated Oct. 3, 2017, 13 pages.

U.S. Appl. No. 14/628,640, Advisory Action dated Sep. 15, 2017, 3 pages.

U.S. Appl. No. 12/970,501, Notice of Allowance dated Sep. 1, 2016, 7 pages.

U.S. Appl. No. 14/851,268, Final Office Action dated Dec. 12, 2016, 17 pages.

(56) References Cited

OTHER PUBLICATIONS

U.S. Appl. No. 12/970,501, Non-Final Office Action dated Apr. 26, 2016, 14 pages.
U.S. Appl. No. 13/762,725, Non-Final Office Action dated May 5, 2016, 17 pages.
U.S. Appl. No. 14/851,268, Non-Final Office Action dated May 9, 2016, 15 pages.
U.S. Appl. No. 14/628,640, Final Office Action dated Jun. 22, 2017, 17 pages.
U.S. Appl. No. 14/851,268, Non-Final Office Action dated Jun. 20, 2017, 17 pages.
Brandon De Hoyos, How to Use Facebook Chat Options, about com, pp. 1-6, http://im.about.com/od/facebookcha1/ss/facbookchatoptions.htm, (Facebook Chat Options for Facebook Chat.pdf).
Dictionary.com, Jul. 27, 2011, https://web.archive.org/web/20110727234611/http://dictionary.reference.com/browse/Expand, (Expand.pdf), pp. 1-2.
Advisory Action for U.S. Appl. No. 13/762,725, dated Feb. 3, 2016, all pages.
Dictionary.com, https://web.archive.org/web/20110727234611/http://dictionary.reference.com/browse/Expand, Jul. 27, 2011, 2 pages.
SocialTimes, Facebook Chat Launches—Tour & First Impressions, Apr. 6, 2008, pp. 1-5.
Bold Software Partners with LiveLOOK to Enhance BoldCCM Product Suites, www.prweb.com/releases/BoldSoftware/LiveLOOK/prweb2536784.htm, date web page visited: Nov. 17, 2009, 2 pages.
Bosco's Screen Share: Web Screen Sharing, Hutchings Software, <http://web.archive.org/web/20050305232959/www.componentx.com/ScreenShare/web.php>, Mar. 5, 2005, 7 pages.
Free Web Conferencing and Always-On Collaboration, www.vyew.com, Jul. 25. 2006, 20 pages.
Instant Screen Sharing with no download . . . , web page; showscreen.com/screen_sharing_partners, date web page visited: Jan. 3, 2010, 3 pages.
Instant Service Adds LiveLOOK's CoBrowsing Capabilities to Chat Solution, www.instantservice.com/news/20071106.html, date web page visited: Nov. 17, 2009, 2 pages.
LiveLOOK is a leading provider of real-time . . . , www.livelook.com/about_us.asp, date web page visited: Jan. 7, 2010, 2 pages.
News Release, New Jersey Economic Development Authority, Nov. 2008, 2 pages.
NGenera CIP Partners with LiveLOOK, Enhances Its Multi-Channel Solution by Boosting the Power of NGen CoBrowse, web page; www.reuters.com/article/pressRelease/idUS120651+14-Apr-2009 +BW20090414, date web page visited: Nov. 17, 2009, 3 pages.
PictureTalk FAQs, Pixion, Inc., <http://web.archive.org/web/20050305010259/www.pixion.com/supportFaq.html>, Mar. 5, 2005, 7 pages.
Press Release, LiveLOOK wins "Best Technology" at Web 2.0 Summit, Jun. 21, 2007, 1 page.
Screen-Sharing: One-Click Solution Lets Anyone Screen-Share Instantly From Any OS-LiveLOOK, web page: www.masternewmedia.org, date web page visited: Jan. 6, 2010, 14 pages.
TightVNC Java Viewer version 1.2.9, TightVNC project, <http://lweb.archive.org/web/2003081 0163821/tightvnc.com/doc/java/READM E. txt>, Aug. 10, 2003, 8 pages.
WebsiteAiive Chooses Live look to Offer Instant Sceen Sharing, websitealive.com/articles-press/websitealive-chooses-livelook, date web page visited: Jan. 3, 2010, 2 pages.
Andersen, GUI Review: Gmail® by Google®, Nov. 5, 2011, pp. 1-26.
Antoine et al., Java applet screenshot, USENET thread, <http://www.velocityreviews.com/forums/t136047-java-appletscreenshot.html, Aug. 12, 2004, 6 pages.
Ohren, Facebook Updates Chat UI—It's Faster & More Stable, Oct. 6, 2010, pp. 1-5.
Siden, Signed Applet Tutorial, <http://web.archive.org/web/20060513070748/http:1/www-personal.umich.edu/-lsiden/tutorials/signed-appletlsignedapplet.html>, Internet Archive on May 13, 2006, pp. 1-5.
Udell, Simple, single-purpose screen sharing, www.infoworld.com/prinU25674; published on InfoWorld, date web page visited: Jan. 3, 2010, 2 pages.
International Application No. PCT/US2007/073209, International Preliminary Report on Patentability dated Jan. 13, 2009, 8 pages.
International Application No. PCT/US2007/073209, International Search Report and Written Opinion dated Aug. 13, 2008, 8 pages.
U.S. Appl. No. 11/456,613, Final Office Action dated Jul. 13, 2009, 18 pages.
U.S. Appl. No. 11/456,613, Non-Final Office Action dated Aug. 8, 2008, 16 pages.
U.S. Appl. No. 11/456,613, Non-Final Office Action dated May 6, 2010, 22 pages.
U.S. Appl. No. 11/456,613, Notice of Allowance dated Jan. 12, 2011, 7 pages.
U.S. Appl. No. 12/970,501, Advisory Action dated Jul. 22, 2013, 3 pages.
U.S. Appl. No. 12/970,501, Advisory Action dated Oct. 15, 2015, 3 pages.
U.S. Appl. No. 12/970,501, Final Office Action dated May 15, 2013, 11 pages.
U.S. Appl. No. 12/970,501, Final Office Action dated Jul. 31, 2015, 12 pages.
U.S. Appl. No. 12/970,501, Non-Final Office Action dated Feb. 5, 2013, 11 pages.
U.S. Appl. No. 12/970,501, Non-Final Office Action dated Feb. 12, 2015, 12 pages.
U.S. Appl. No. 13/071,607, Non-Final Office Action dated Aug. 5, 2011, 22 pages.
U.S. Appl. No. 13/762,725, Final Office Action dated Nov. 12, 2015, 21 pages.
U.S. Appl. No. 13/762,725, Non-Final Office Action dated Apr. 9, 2015, 19 pages.
U.S. Appl. No. 14/628,640, Non-Final Office Action dated Feb. 24, 2017, 13 pages.
U.S. Appl. No. 14/628,640 received a Non-Final Office Action dated May 10, 2018, 20 pages.
U.S. Appl. No. 15/590,543 received a Notice of Allowance dated Apr. 11, 2018, 5 pages.
U.S. Appl. No. 11/456,613 received a Restriction Requirement dated May 11, 2009, 6 pages.
PCT/US2018/026407 received an International Search Report and Written Opinion, dated Jun. 28, 2018, 13 pages.
U.S. Appl. No. 14/851,268, Notice of Allowance dated Jan. 4, 2018, 5 pages.
U.S. Appl. No. 15/590,543, Non Final Office Action dated Dec. 8, 2017, 8 pages.

\* cited by examiner

AUTOMATIC SIZING OF AGENT'S SCREEN FOR HTML CO-BROWSING APPLICATIONS

BACKGROUND OF THE INVENTION

Embodiments of the present invention relate generally to methods and systems for improved co-browsing between parties and more particularly to automatic or adaptive sizing of a customer service agent's co-browsing view of a contact's user interface.

Customer Relationship Management (CRM) systems provide support for customers of a product or service by allowing those users to make requests for service that can include a question posed by the user related to the product or service. For example, a user may log onto or access a CRM system provided by a manufacturer of cellphones and request information related to use of that device and that may include a question such as "How do I adjust the brightness of the display?" Generally speaking, these systems receive requests for service, e.g., in the form of a phone call, web page form, instant message, email, etc., and route the requests to a human agent for addressing the request and providing an answer to the question. In ideal cases, the agent is selected based on the topic of the question or request and a predefined profile of that agent that includes indications of the agent's skills and/or expertise. This skills-based route can be done by an Automated Call Distribution (ACD) system that is either part of or separate from the CRM system.

Once the agent and the customer or other user have been connected, a live session can be conducted between the agent and the customer. This session can include co-browsing, i.e., providing a common view of the customer's browser or other interface to the agent. In such cases, the customer can share his or her screen with the agent and the agent can browse the web site together with the customer. Typically, the agent will use a desktop PC with a decent screen resolution. The customer, on the other end, can be on a mobile device or on a computer with different screen resolution. In such cases the customer may only see a portion of a page, while the agent sees the entire page. This can lead to confusion between the customer and the agent. For example, the agent may try to navigate the customer to content that is not seen on the customer's screen. Hence, there is a need for improved methods and systems for automatic or adaptive sizing of the agent's co-browsing view of the contact's interface.

BRIEF SUMMARY OF THE INVENTION

Embodiments of the invention provide systems and methods for automatic or adaptive sizing of a customer service agent's co-browsing view of a contact's user interface. According to one embodiment, sizing of an interface view in a co-browsing session can comprise receiving, by a client device from a Customer Relationship Management (CRM) system, a request to initiate the co-browsing session. The request to initiate the co-browsing session can be accepted by the client device. In response to the client device accepting the request, the CRM system can provide to the client device a client-side co-browsing application. The client device can in turn receive and install the client-side co-browsing application and the co-browsing session between the client device and CRM system can be initiated though the client-side co-browsing application.

Additionally, the client-side co-browsing application, once installed on the client device, can collect size information indicating a current size of a browser window of the client device that is a subject of the co-browsing session and provide the collected size information to the CRM system. The CRM system can receive this size information indicating the current size of the browser window of the client device that is the subject of the co-browsing session and update an agent interface provided to a customer service agent. The agent interface can include a co-browsing view of the browser window of the client device and wherein this co-browsing view of the browser window of the client device can be presented based on the received size information.

According to one embodiment, the CRM system can provide in the agent interface a control to toggle sizing of the co-browsing view of the browser window of the client on and off. In such cases, the CRM system can toggle sizing of the co-browsing view on or off in response to a selection of the control. Toggling sizing of the co-browsing view on can comprise matching the size of the co-browsing view of the browser window of the client to the size of the browser window of the client device based on the received size information. Toggling sizing of the co-browsing view off can comprise sizing the co-browsing view of the browser window to a size different from the browser window of the client device.

According to one embodiment, the client-side co-browsing application can detect, during the co-browsing session, a change in the current size of the browser window of the client device that is the subject of the co-browsing session. For example, detecting the change in the current size of the browser window of the client device that is the subject of the co-browsing session can comprise detecting an event indicating a change in the current size of the browser window. In another example, detecting the change in the current size of the browser window of the client device that is the subject of the co-browsing session can comprise periodically checking the current size of the browser window and comparing the current size of the browser window to the size information previously provided to the CRM system. In response to detecting the change in the current size of the browser window of the client device that is the subject of the co-browsing session, the client-side co-browsing application installed on the client device can collect new size information indicating a new current size of a browser window of the client device that is a subject of the co-browsing session and provide the collected new size information to the CRM system. The CRM system can in turn receive the updated size information collected from the client device by the client-side co-browsing application during the co-browsing session and indicating the change in the size of the browser window of the client device. In response, the CRM system can update the co-browsing view of the browser window of the client device in the agent interface based on the received updated size information.

DETAILED DESCRIPTION OF THE INVENTION

Figure 1:
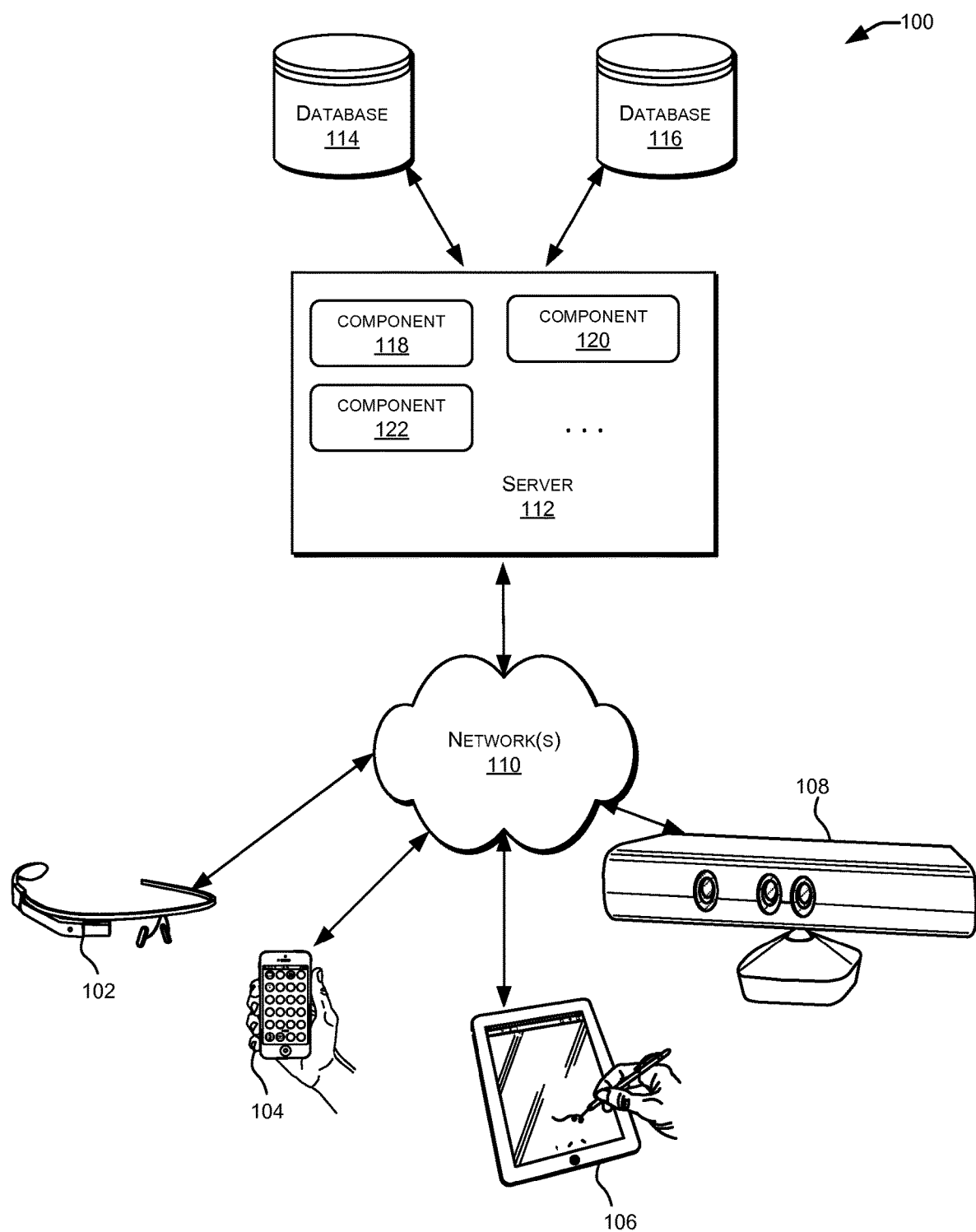
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
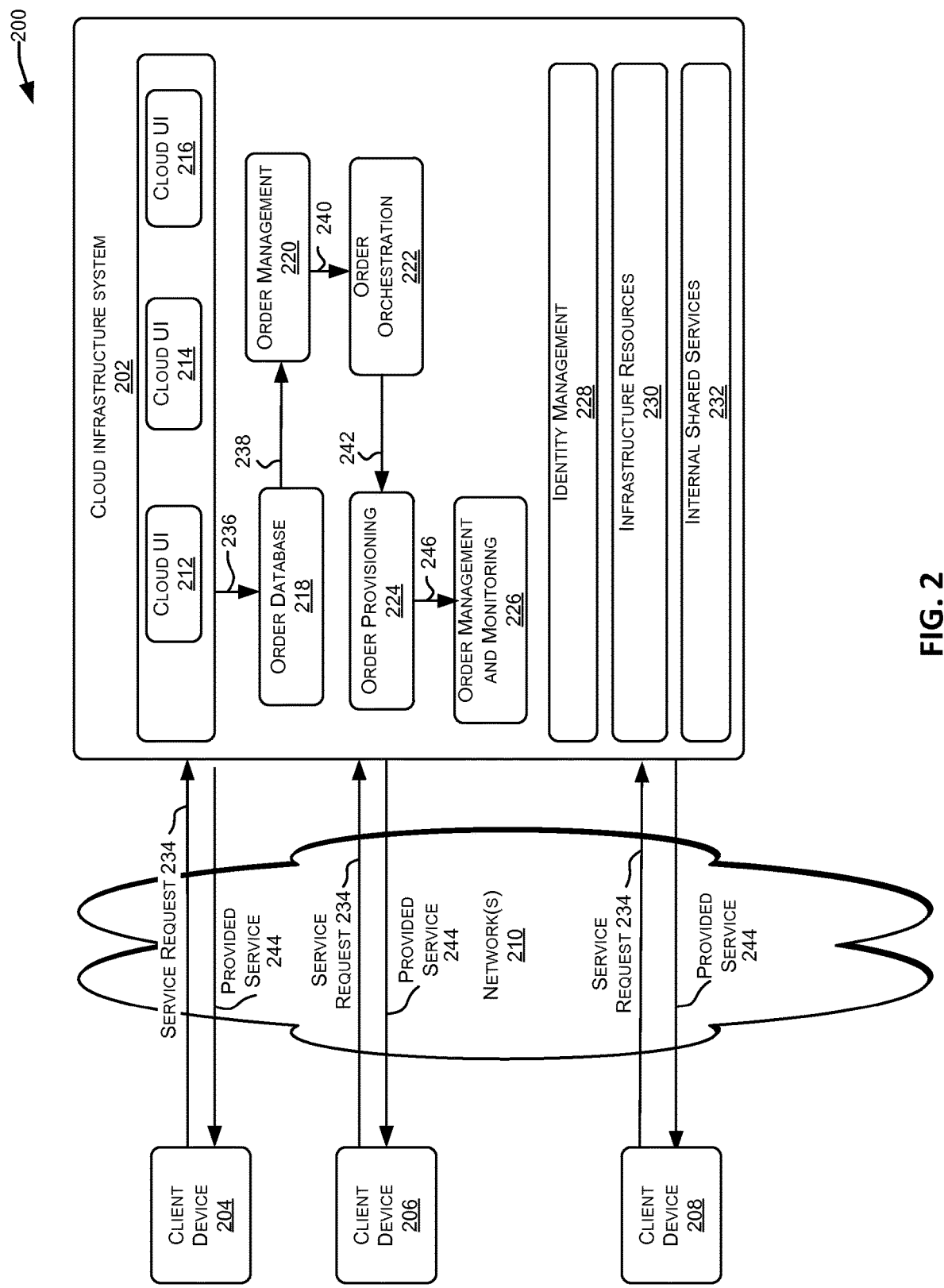
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
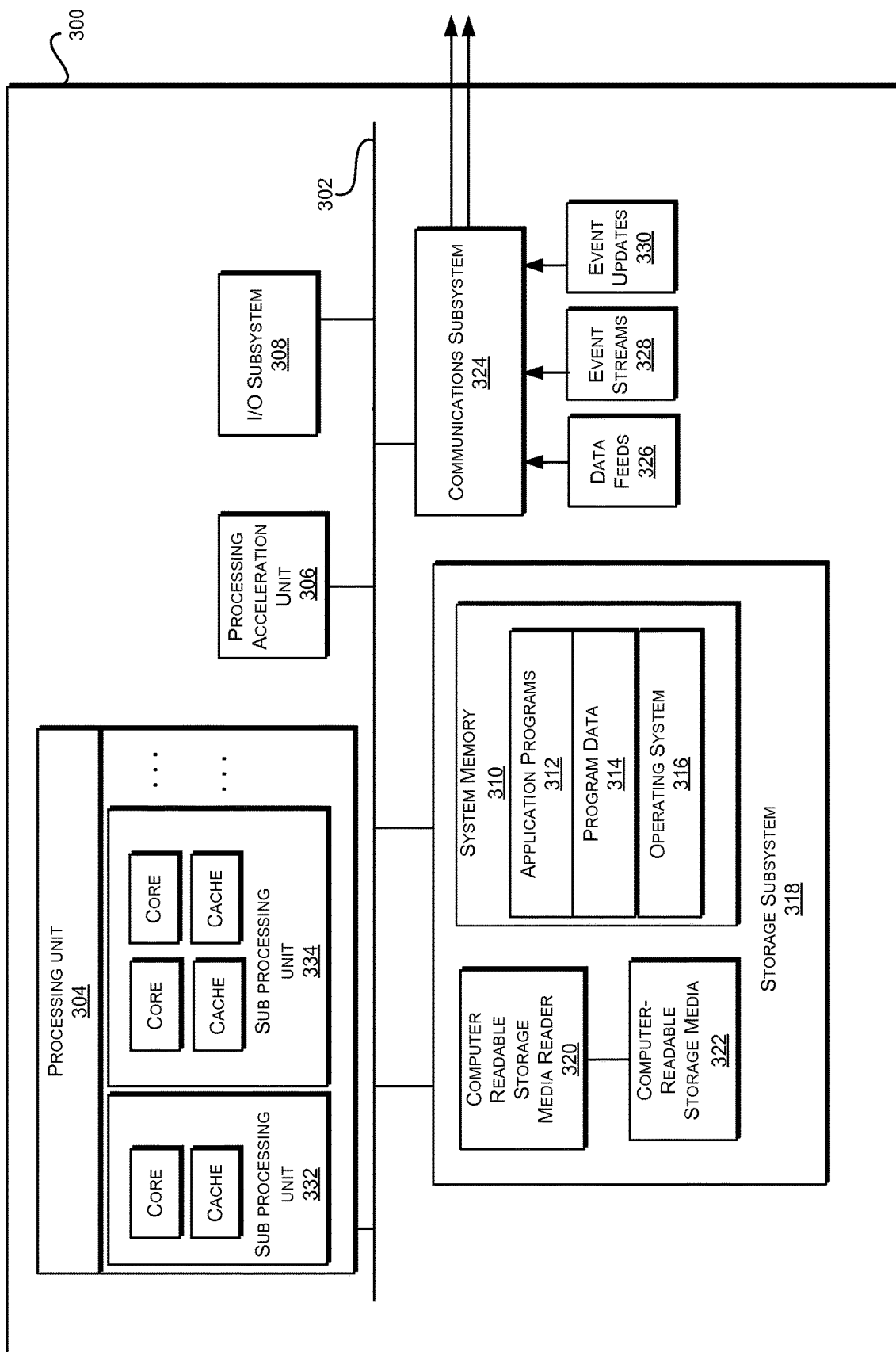
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
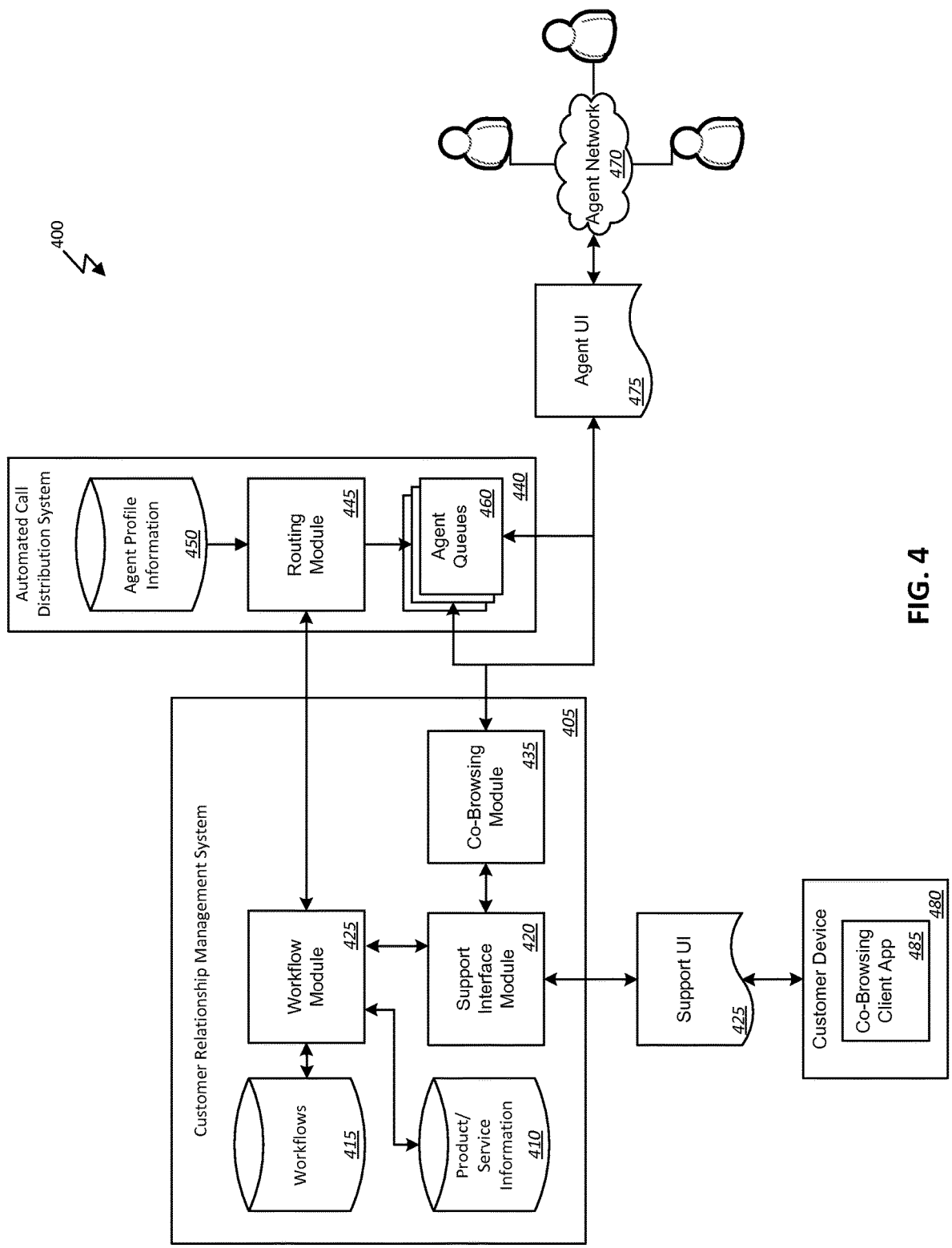
FIG. 4 is a block diagram illustrating, at a high-level, functional components of a system for sizing of an agent's co-browsing view of the contact's interface according to one embodiment of the present invention.

FIG. 4 is a block diagram illustrating, at a high-level, functional components of a system for sizing of an agent's co-browsing view of the contact's interface according to one embodiment of the present invention. In this example, the system 400 includes a Customer Relationship Management (CRM) system 405 such as may be executed on a server or another computer or computing device as described above. The CRM system 405 can include information 410 for products and/or services supported by the CRM system 405. The CRM system 405 can also include a set of information defining any number of workflows 415. Generally speaking, these workflows 415 can comprise scripts for guiding a customer contact attempting to find information or troubleshoot a problem, selecting and/or guiding a customer service agent through performing troubleshooting, or other actions of the CRM system 405.

The CRM system 405 can support a number of users, such as end users of a product or service, can receive requests for support or service from those users, and process those requests in order to direct the user to appropriate product or service information 410 and/or connect or direct the requesting users to one or more agents 470 for answers to questions posed in the requests. For example, a support interface module 420 of the CRM system 405 can provide one or more interfaces 425 including but not limited to web pages, email addresses, phone lines, chat and/or instant messaging, and/or any of a variety of other communication channels to customer users of the system 400. Through these channels/interfaces 425, the customers can access information and/or make requests for support that may include questions to be answered by the agents 470.

Once received, these requests and/or customer contacts can be evaluated by the workflow module 430 based on the product information 410, for example, to select an agent workflow 415. That is, for a particular product and issue that is the subject of the request or contact, a workflow to be performed, e.g., to troubleshoot a problem, obtain more information, etc., can be selected for performance by a customer service agent. The product information, selected workflow and other information received with the request can be forwarded to a routing module 445 of an Automated Call Distribution (ACD) system 440 which can then direct the request or contact to a selected agent 470 with matching expertise. That is, the routing module 445 can identify an agent with a skillset defined in agent profile information 450 that is appropriate for the nature of the contact and then connect the customer with that agent through email, phone, chat and/or instant messaging, and/or any of a variety of other communication channels. It should be noted that while illustrated here as separate from the CRM system 405, the ACD system 440 and/or routing module 445 and other components thereof may, in other implementations, be part of the CRM system 405 without departing from the scope of the present invention.

According to one embodiment, the CRM system 405 can also include a co-browsing module 435. Generally speaking, the co-browsing module 435 can, once the agent and customer are connected, allow the two to share screen images in near real-time. For example, the agent can view, through his own interface 475, the current view of the customer's desktop and/or browser window. Such screen sharing through web browsers is referred to herein as co-browsing. Also as used herein, a host is a user or online visitor who is showing his or her computer screen and an agent is a user who is remotely viewing the host's computer screen. An example implementation of web-based co-browsing is described in U.S. Pat. No. 7,933,955 filed Jul. 11, 2006, titled "One-Click Universal Screen Sharing", which is incorporated herein by reference in its entirety.

According to one embodiment, the co-browsing module 435 can be adapted to automatically re-size at least a portion of the agent's interface 475 in which the customers interface 425 is presented so that the agent's view matches the customer's view, e.g., one-to-one. This sizing of the agent's view may be performed automatically, when the co-browsing view of the customer's interface 425 is first presented to the agent or, according to one embodiment, may be toggled on and off by the agent, e.g., by the agent selecting a button or other control presented in the agent's interface 475. In this way, embodiments allow the agent to see exactly the same view of the web site as the customer sees in the customer's interface 425 regardless of the device or screen size used by the customer. Thus, the agent can suggest scrolling the web pages as necessary to access the wanted content. This can greatly enhance communication between the agent and the customer leading to improved call resolution times and higher customer satisfaction.

More specifically, when a customer contact is routed to a selected agent, a communication session, such as a chat session for example, can be initiated between the customer and the agent. Through this session, the agent may request to co-browse the customer's interface 425. As described in the related application entitled "One-Click Universal Screen Sharing" cited above, the customer can then be presented, through the customer interface 425 the option to accept or reject this request. In response to accepting the request, a co-browsing application or applet 485 may be downloaded to and launched on the customer's device 480. This client-side application 485, once running, can provide for capturing the web pages currently viewed by the customer's browser and returning that information to the co-browsing module 435 for presentation in the agent's interface 475 so that the agent can view, in real-time, the same view presented in the customer's interface 425. Additionally, this client side application 485 can query the customer's device 480 for information such as the display size or resolution (e.g., in pixels), current browser window size (e.g., in pixels), etc. and return such information to the co-browsing module 435.

After the client-side application 480 launches and returns the collected information, the co-browsing module 435 can update the agent's interface 475 to present the live co-browsing information, i.e., the view of the customer's interface 425. Additionally, this presented view can be sized according to the information collected by the client application 485. That is, the co-browsing presentation of the customer's interface 425 provided through the agent's interface 475 by the co-browsing module 435 can be sized to match, e.g., the same number of pixels, the browser window of the customer device. According to one embodiment, this sizing can be implemented automatically and applied with the initial presentation of the co-browsing view in the agent interface 475. Additionally or alternatively, this sizing may be toggled on and off, i.e., between a default size or size applied by the agent and the matching size of the customer interface 425, based on an agent action such as selection of a button or control presented to the agent in the agent interface 475. It should also be noted that, according to one embodiment, this size determination may be determined once upon the initiation of the co-browsing session or on an ongoing basis throughout the co-browsing session between the customer and agent. For example, the client application 485 may periodically re-check the browser window size of the customer device 480 or may be triggered by an event such as a re-size of the browser window size of the customer device 480. In either case, the client application 485 can send an update to the co-browsing module 435 which may in turn update the agent interface 475 to match the view of the customer interface 425 on the client device 480.

Figure 5:
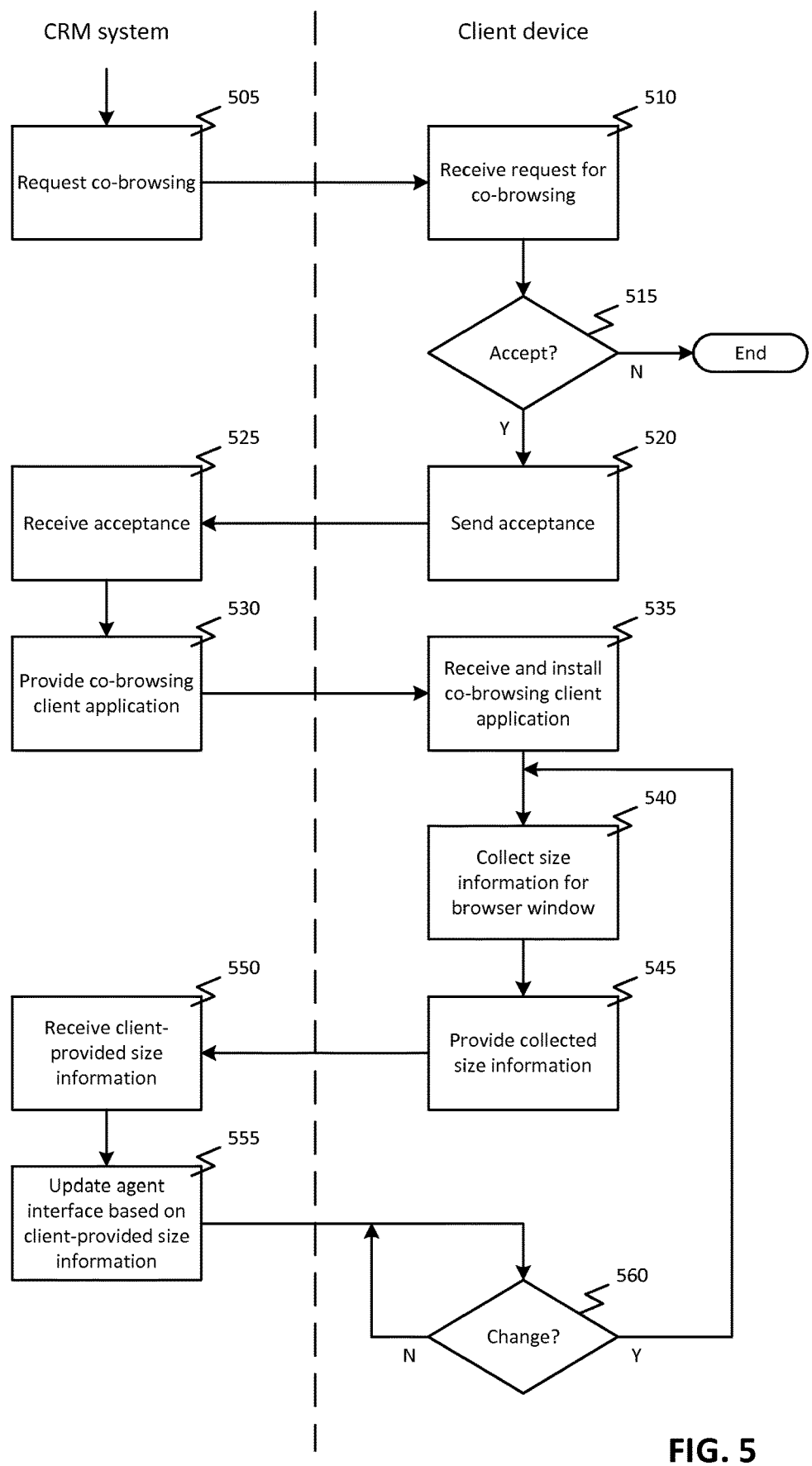
FIG. 5 is a flowchart illustrating a process for sizing of an agent's co-browsing view of the contact's interface according to one embodiment of the present invention.

FIG. 5 is a flowchart illustrating a process for sizing of an agent's co-browsing view of the contact's interface according to one embodiment of the present invention. As illustrated in this example, the process can begin with a request 505 from the CRM system 405 to the customer device 480 to initiate a co-browsing session, e.g., by the agent making the request to the customer once they have been otherwise connected and established a communication session as described above. The customer device 480 can receive 510 this request and may give the customer an opportunity to accept or reject the request to start a co-browsing session. In response to acceptance 515, the customer device can send 520 an acceptance message or acknowledgement to the CRM system 405. Upon receiving 525 the acceptance message from the customer device 480, the CRM system 405 can provide 530 the co-browsing client application 485 to the customer device 480. As described above and in the related application entitled "One-Click Universal Screen Sharing" cited above, this application can comprise a script, applet, application, or other code that is executable on the customer device 480. The customer device 480 can, in turn, receive and install 535 the co-browsing client application 485.

Once installed 535 and executing on the customer device 480, the co-browsing client application 485 can initiate a co-browsing session between the customer device 480 and the co-browsing module 435 of the CRM system 405, i.e., capture the current content of the browser window and feed that captured content to the co-browsing module 435 of the CRM system 405 for presentation to the agent through the agent interface 475. As part of initiating this co-browsing session, the co-browsing client application 485 can also collect 540 size information indicating a current size of the browser window, e.g., by a query or call to the browser application itself. The size information can be provided 545 by the co-browsing client application 485 to the co-browsing module 435 of the CRM system 405. The co-browsing module 435 can in turn receive 550 the size information from the co-browsing client application 485 and update 555 the agent interface 475 so that the window or other representation of the customer's interface 435 presented in the agent's interface 475 matches the size of the window in which the customer's interface 425 is currently displayed on the customer's device 480.

As noted above, the size matching or updating 555 applied by the co-browsing module 435 to the agent's interface 475 may be applied selectively. For example, the agent interface 475 may include a button or control to allow the agent to toggle size matching on and off. In such cases, the agent can toggle size matching on to see the same view of the customer's interface 425 presented on the customer device 480 or toggle size matching off to see a different, e.g., bigger, wider, etc., view of the customer's interface 425 for a different perspective, easier navigation, etc.

Also as noted above, the size information collection 540 and 545 by the co-browsing client application 485 and agent interface 475 updating 550 and 555 by the co-browsing module 435 may be performed once upon the initiation of the co-browsing session or on an ongoing basis throughout the co-browsing session between the customer and agent. For example, the client application 485 may determine 560 if the browser window size on the customer device 480 has changed. This determination 560 can be made by the co-browsing client application 485 periodically re-checking the browser window size of the customer device 480 or may be triggered by an event such as a re-size of the browser window size of the customer device 480. In either case, the co-browsing client application 485 can once again collect 540 and provide 545 size information for the browser window in the customer device 480 and the co-browsing module can receive 550 the size information and update 555 the agent's interface 475 accordingly. For example, if sizing is toggled on, the agent's view may resize automatically. If sizing is toggled off, a notification may be provided that re-sizing has occurred and can be applied to the agent's view once sizing is toggled on. Such live, automatic updating may continue until the co-browsing session is ended by the customer or the agent or until disabled, e.g., by a selection of a button or control on one of the customer interface 425 of agent interface 475.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for sizing of an interface view in a co-browsing session, the method comprising:
providing, by a Customer Relationship Management (CRM) system to a client device, a client-side co-browsing application;
initiating, by the CRM system, a co-browsing session with the client device though the client-side co-browsing application;
receiving, by the CRM system, upon initiating the co-browsing session, information indicating a current display resolution of a co-browsing view of a browser window of the client device and a current size of the co-browsing view of the browser window of the client device that is a subject of the co-browsing session, the information of the current size of the co-browsing view of the browser window and the current display resolution of the co-browsing view of the browser window collected from the client device by the client-side co-browsing application;
sizing, by the CRM system, a co-browsing view of a browser window of an agent interface provided to a customer service agent using the current display resolution of the co-browsing view of the browser window of the client device and the current size of the co-browsing view of the browser window of the client device, wherein a current display resolution of the co-browsing view of the browser window of the agent interface and a current size of the co-browsing view of the browser window of the agent interface are initially the same as the current display resolution of the co-browsing view of the browser window of the client device and the current size of the co-browsing view of the browser window of the client device;
providing, by the CRM system in the agent interface, an adjustment control configured to adjust the co-browsing view of the browser window of the agent interface by toggling the co-browsing view of the browser window of the agent interface to (i) on to use the current display resolution of the co-browsing view of the browser window of the client device and the current size of the co-browsing view of the browser window of the client device, and (ii) off to use an agent adjustable resolution of the co-browsing view of the browser window of the agent interface and an agent adjustable size of the co-browsing view of the browser window of the agent interface;
receiving, by the CRM system via the agent interface, a selection of the adjustment control;
determining that the selection of the adjustment control adjusts the adjustment to off;
in response to receiving the selection of the adjustment control, adjusting the co-browsing view of the browser of the agent interface using a display resolution of the co-browsing view of the browser of the agent interface that is different than the display resolution of the co-browsing view of the browser window of the client device and a size of the co-browsing view of the browser window of the agent interface that is different than the current size of the co-browsing view of the browser window of the client device;

in response to determining that the selection of the adjustment control adjusts the adjustment to off, providing a notification by the CRM system via the agent interface, that re-sizing of the co-browsing view of the browser window of the client device has occurred and can be applied to the co-browsing view of the browser of the agent interface once the adjustment control is adjusted back to on;

determining that the selection of the adjustment control toggles the sizing on; and in response to receiving the selection of the adjustment control, adjusting the co-browsing view of the browser window of the browser of the agent interface using the current display resolution of the client device and the current size of the co-browsing view of the browser window of the client device.

2. The method of claim 1, further comprising:

in response to receiving the selection of the adjustment control, adjusting the co-browsing view of the browser window of the browser of the agent interface using a default display resolution and a default size of the browser window of the browser of the agent interface.

3. The method of claim 1, further comprising:

receiving, by the CRM system, updated size information of the browser window of the client device collected from the client device by the client-side co-browsing application during the co-browsing session and indicating a change in the size of the browser window of the client device; and updating, by the CRM system, the co-browsing view of the browser window of the agent interface based on the received updated size information of the browser window of the client device.

4. A method for sizing of an interface view in a co-browsing session, the method comprising:

receiving, by a client device from a Customer Relationship Management (CRM) system, a request to initiate a co-browsing session;

accepting, by the client device, the request to initiate the co-browsing session;

in response to accepting the request, receiving, by the client device from the CRM system, a client-side co-browsing application;

installing, by the client device, the received client-side co-browsing application;

receiving, by the CRM system, upon initiating the co-browsing session, information indicating a current display resolution of a co-browsing view of a browser window of the client device and a current size of the co-browsing view of the browser window of the client device that is a subject of the co-browsing session, the information of the current size of the co-browsing view of the browser window and the current display resolution of the co-browsing view of the browser window collected from the client device by the client-side co-browsing application;

sizing, by the CRM system, a co-browsing view of a browser window of an agent interface provided to a customer service agent using the current display resolution of the co-browsing view of the browser window of the client device and the current size of the co-browsing view of the browser window of the client device, wherein a current display resolution of the co-browsing view of the browser window of the agent interface and a current size of the co-browsing view of the browser window of the agent interface are initially the same as the current display resolution of the co-browsing view of the browser window of the client device and the current size of the co-browsing view of the browser window of the client device;

providing, by the CRM system in the agent interface, an adjustment control configured to adjust the co-browsing view of the browser window of the agent interface by toggling the co-browsing view of the browser window of the agent interface to on to use the current display resolution of the co-browsing view of the browser window of the client device and the current size of the co-browsing view of the browser window of the client device, and off to use an agent adjustable resolution of the co-browsing view of the browser window of the agent interface and an agent adjustable size of the co-browsing view of the browser window of the agent interface;

receiving, by the CRM system via the agent interface, a selection of the adjustment control;

determining that the selection of the adjustment control adjusts the adjustment off;

in response to receiving the selection of the adjustment control, adjusting the co-browsing view of the browser of the agent interface using a display resolution of the co-browsing view of the browser of the agent interface that is different than the display resolution of the co-browsing view of the browser window of the client device and a size of the co-browsing view of the browser window of the agent interface that is different than the current size of the co-browsing view of the browser window of the client device;

in response to determining that the selection of the adjustment control adjusts the adjustment to off, providing a notification by the CRM system via the agent interface, that re-sizing of the co-browsing view of the browser window of the client device has occurred and can be applied to the co-browsing view of the browser of the agent interface once the adjustment control is adjusted back to on;

determining that the selection of the adjustment control toggles the sizing on; and in response to receiving the selection of the adjustment control, adjusting the co-browsing view of the browser window of the browser of the agent interface using the current display resolution of the client device and the current size of the co-browsing view of the browser window of the client device.

5. The method of claim 4, further comprising detecting a change in the current size of the browser window of the client device that is the subject of the co-browsing session.

6. The method of claim 5, wherein detecting the change in the current size of the browser window of the client device that is the subject of the co-browsing session comprises detecting an event indicating a change in the current size of the browser window of the client device during the co-browsing session.

7. The method of claim 5, wherein detecting the change in the current size of the browser window of the client device that is the subject of the co-browsing session comprises periodically checking the current size of the browser window of the client device and comparing the current size of the browser window of the client device to the size information provided to the browser window of the agent interface of the CRM system during the co-browsing session.

8. The method of claim 5, further comprising, in response to detecting the change in the current size of the browser window of the client device that is the subject of the co-browsing session:
  collecting, by the client-side co-browsing application installed on the client device, new size information of the browser window of the client device indicating a new current size of browser window of the client device that is a subject of the co-browsing session; and
  providing, by the client device through the client-side co-browsing application to the browser window of the agent interface of the CRM system, the collected new size information of the browser window of the client device.

9. A system comprising:
  a communication network;
  a server coupled with the communication network and executing a Customer Relationship Management (CRM) application; and
  a client device coupled with the communication network, wherein the client device and CRM application of the server initiate a co-browsing session and wherein:
    the CRM system provides to the client device a client-side co-browsing application,
    the client device receives, from the CRM system, the client-side co-browsing application, installs the received client-side co-browsing application, collects, using the client-side co-browsing application, current information of a browser window of the client device indicating a current display resolution of a co-browsing view of a browser window of the client device and a current size of the co-browsing view of the browser window of the client device that is a subject of the co-browsing session, the information of the current size of the co-browsing view of the browser window and the current display resolution of the co-browsing view of the browser window collected from the client device by the client-side co-browsing application, and provides the collected current display resolution of the co-browsing view of the browser window of the client device and the collected information of the current size of the co-browsing view of the browser window size of the browser window of the client device to the CRM system through the client-side co-browsing application,
    the CRM system receives the current display resolution of the co-browsing view of the browser window of the client device and current browser window size information of the co-browsing view of the client device from the client device and sizes a co-browsing view of a browser window of an agent interface provided to a customer service agent by the CRM application using the current display resolution of the co-browsing view of the browser window of the client device and the current size of the co-browsing view of the browser window of the client device, wherein a current display resolution of the co-browsing view of the browser window of the agent interface and a current size of the co-browsing view of the browser window of the agent interface are initially the same as the current display resolution of the co-browsing view of the browser window of the client device and the current size of the co-browsing view of the browser window of the client device,
    the CRM system provides an adjustment control in the agent interface, the adjustment control configured to adjust the co-browsing view of a browser window of the agent interface by toggling the co-browsing view of the browser window of the agent interface to ON to use the current display resolution of the co-browsing view of the browser window of the client device and the current size of the co-browsing view of the browser window of the client device, and to OFF to use an agent adjustable resolution of the co-browsing view of the browser window of the agent interface and an agent adjustable size of the co-browsing view of the browser window of the agent interface;
    the CRM system receives via the agent interface, a selection of the adjustment control;
    the CRM system determines that the selection of the adjustment control adjusts the adjustment off;
    in response to receiving the selection of the adjustment control, the CRM system adjusts the co-browsing view of the browser widow of the agent interface using a display resolution of the co-browsing view of the browser of the agent interface that is different than the display resolution of the co-browsing view of the browser window of the client device and a size of the co-browsing view of the browser window of the agent interface that is different than the current size of the co-browsing view of the browser window of the client device;
    in response to determining that the selection of the adjustment control adjusts the adjustment to off, providing a notification by the CRM system via the agent interface, that re-sizing of the co-browsing view of the browser window of the client device has occurred and can be applied to the co-browsing view of the browser of the agent interface once the adjustment control is adjusted back to on;
    the CRM system determines that the selection of the adjustment control adjusts the adjustment on; and
    in response to receiving the selection of the adjustment control, adjusting the co-browsing view of the browser window of the browser of the agent interface using the current display resolution of the client device and the current size of the co-browsing view of the browser window of the client device.

10. The system of claim 9, wherein the CRM application of the server, in response to receiving the selection of the adjustment control, adjusts the co-browsing view of the browser window of the agent interface using a default display resolution and a default size of the co-browsing view of the browser window of the agent interface.

11. The system of claim 9, wherein the client device further detects a change in the current size of the browser window of the client device that is the subject of the co-browsing session.

12. The system of claim 11, wherein detecting the change in the current size of the co-browsing view of the browser window of the client device that is the subject of the co-browsing session comprises detecting an event indicating a change in the current size of the co-browsing view of the browser window of the client device.

13. The system of claim 11, wherein detecting the change in the current size of the co-browsing view of the browser window of the client device that is the subject of the co-browsing session comprises periodically checking the current size of the co-browsing view of the browser window of the client device and comparing the current size of the co-browsing view of the browser window of the client device to the current size information of the co-browsing view provided to the browser window of the agent interface of the CRM system.

14. The system of claim 11, wherein the client device, in response to detecting the change in the current size of the co-browsing view of the browser window of the client device that is the subject of the co-browsing session, collects new size information of the co-browsing view of the browser window of the client device indicating a new current size of the co-browsing view of the browser window of the client device that is a subject of the co-browsing session and provides to the browser window of the agent interface of the CRM system, the collected new size information of the co-browsing view of the browser window of the client device.

15. The system of claim 14, wherein the CRM application of the server further receives the new size information of the co-browsing view of the browser window of the client device collected from the client device by the client-side co-browsing application during the co-browsing session and updates the co-browsing view of the browser window of the client device in the co-browsing view of the browser window of the agent interface based on the new size information of the co-browsing view of the browser window of the client device.

16. The system of claim 15, wherein the client device continues to detect a change in the current size of the co-browsing view of the browser window of the client device that is the subject of the co-browsing session, collect new size information of the co-browsing view of the browser window of the client device indicating a new current size of the co-browsing view of the browser window of the client device that is a subject of the co-browsing session, and provide to the browser window of the agent interface of the CRM system the collected new size information of the co-browsing view of the browser window of the client device until the co-browsing session is finished.

* * * * *